US011499661B2

(12) United States Patent
Neri et al.

(10) Patent No.: US 11,499,661 B2
(45) Date of Patent: Nov. 15, 2022

(54) HYDRAULIC AND/OR PNEUMATIC MULTI-COUPLING CONNECTOR WITH LEVER ACTUATED MECHANISM

(71) Applicant: FASTER S.R.L., Rivolta D'Adda (IT)

(72) Inventors: Marco Neri, Rivolta D'Adda (IT); Rocco Ferrara, Rivolta D'Adda (IT); Luigi Canzi, Melzo (IT); Roberto Sorbi, Rivolta D'Adda (IT)

(73) Assignee: FASTER S.R.L., Rivolta d'Adda (IT)

( * ) Notice: Subject to any disclaimer, the term of this patent is extended or adjusted under 35 U.S.C. 154(b) by 291 days.

(21) Appl. No.: 16/816,624

(22) Filed: Mar. 12, 2020

(65) Prior Publication Data

US 2020/0309306 A1 Oct. 1, 2020

(30) Foreign Application Priority Data

Mar. 28, 2019 (EP) ..................................... 19165845

(51) Int. Cl.
*F16L 37/56* (2006.01)
*F16L 37/44* (2006.01)
*F16K 31/52* (2006.01)
*F16L 55/07* (2006.01)

(52) U.S. Cl.
CPC .............. *F16L 37/56* (2013.01); *F16K 31/52* (2013.01); *F16L 37/44* (2013.01); *F16L 55/07* (2013.01)

(58) Field of Classification Search
CPC . F16L 55/07; F16L 37/56; F16L 37/44; F16K 31/52408; F16K 31/52; F16K 11/185
See application file for complete search history.

(56) References Cited

U.S. PATENT DOCUMENTS

| 2,396,993 | A | * | 3/1946 | Fawkes | F15B 13/04 |
| | | | | | 137/596.1 |
| 2,548,933 | A | * | 4/1951 | Barnett | F16K 31/602 |
| | | | | | D23/255 |
| 2,853,100 | A | * | 9/1958 | Donnelly | B67D 1/12 |
| | | | | | 251/102 |
| 4,348,917 | A | * | 9/1982 | Gardner | F16K 31/52416 |
| | | | | | 251/234 |
| 7,568,502 | B2 | | 8/2009 | Marquis | |

(Continued)

FOREIGN PATENT DOCUMENTS

| CN | 104948209 A | | 9/2015 |
| DE | 525168 C | * | 2/1932 |

(Continued)

OTHER PUBLICATIONS

European Search Report, dated Sep. 25, 2019 for corresponding European patent application No. EP 19165845.9.

*Primary Examiner* — Zachary T Dragicevich
*Assistant Examiner* — James A Linford
(74) *Attorney, Agent, or Firm* — Amster, Rothstein & Ebenstein; Steven Hertzberg

(57) ABSTRACT

The present invention relates to a hydraulic and/or pneumatic multi-coupler connector of the type comprising at least one pair of couplers inserted into a containment body and equipped with a lever actuated mechanism comprising an actuation lever maneuverable by the user for the relief of the residual pressure of the couplers and the connection thereof to corresponding male couplers.

12 Claims, 9 Drawing Sheets

(56) References Cited

U.S. PATENT DOCUMENTS

| | | | | |
|---|---|---|---|---|
| 2006/0273580 A1* | 12/2006 | Marquis | ................ | F16L 37/56 |
| | | | | 285/124.5 |
| 2017/0321836 A1* | 11/2017 | Danelli | ................ | F16L 37/34 |
| 2019/0145561 A1* | 5/2019 | Canzi | .................... | F16K 31/52 |
| | | | | 251/149 |
| 2021/0348360 A1* | 11/2021 | Knapper | .............. | E02F 3/3663 |

FOREIGN PATENT DOCUMENTS

| | | | | | |
|---|---|---|---|---|---|
| DE | 102015202916 A1 | * | 8/2016 | | |
| WO | 2015/067793 A1 | | 5/2015 | | |
| WO | 2015/068141 A2 | | 5/2015 | | |
| WO | WO-2020208480 A1 | * | 10/2020 | .............. | F16L 37/23 |

\* cited by examiner

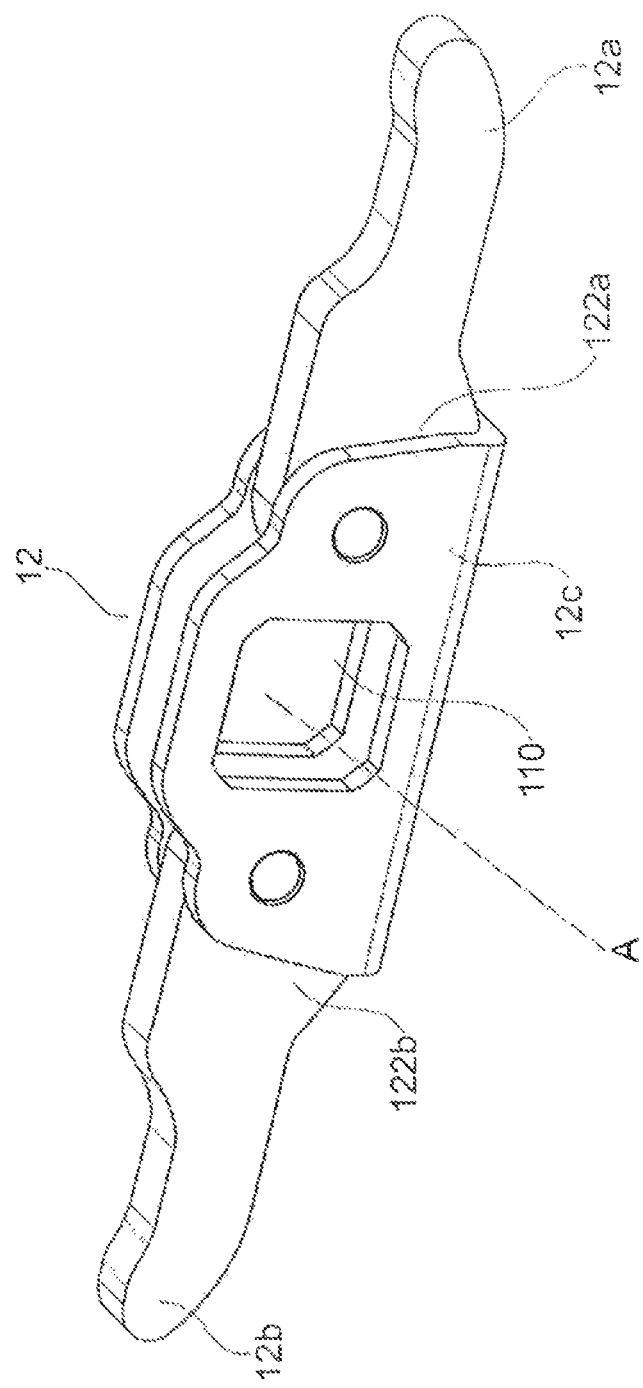

HYDRAULIC AND/OR PNEUMATIC MULTI-COUPLING CONNECTOR WITH LEVER ACTUATED MECHANISM

FIELD OF THE INVENTION

The present invention belongs to the field of hydraulic and/or pneumatic connections. In particular, the present invention relates to a multi-coupling hydraulic and/or pneumatic connector. In detail, the present invention relates to a multi-coupling hydraulic and/or pneumatic connector comprising a pair of quick couplings and a lever for actuating a pressure relief of said couplings.

More in detail, the connector according to the present invention comprises at least two couplings of the female type, adapted to be actuated by means of a lever.

The present invention provides, in detail, a connector of the aforesaid type, shaped so as to allow a simplified assembly thereof simplified with respect to the connectors of the corresponding type as known in the background art.

Furthermore, the device of the present invention comprises an actuating mechanism adapted to contain the overall dimension of the device with respect to the overall dimension of devices according to the prior art.

BACKGROUND ART

Connection devices (in the following also generally identified as connectors, where appropriate) comprising one or a pair of manually actuatable quick couplings (in the following also referred to as quick couplers or even simply couplers) of the female type are known in the field of hydraulic and/or pneumatic connections.

Among the known solutions, from document U.S. Pat. No. 6,016,835 A there is known a connector comprising a female coupler housed in a seat defined by a main containment body, said female coupling being actuatable by the user by means of a lever and a camshaft for the purpose of decreasing or relieving the residual pressure inside the coupler. In fact, female couplers of the kind known from the above-mentioned prior art requires that the residual pressure inside them be preventively (beforehand) reduced or even relieved for them to be connected to corresponding male couplings.

A further solution multi-coupler device is disclosed in pending EP patent application nr. 17197329 filed by the same Applicant of present application: for the sake of convenience, reference is made in the following to FIGS. 1 and 2 of EP 17197329. As apparent, the residual pressure inside the female couplers 20a and 20b is relieved (before and/or during the coupling thereof with corresponding male couplings, not depicted) by means of a lever 10 under action of a user. In particular, and still as depicted the actuation lever 10 is mechanically connected to a rotating main pin 11 on which there is keyed (to which here is rigidly fixed) a rocker arm comprising a first end portion 12a and a second end portion 12b opposite (with respect to the pin 11) to said first end portion 12a. Still as apparent, and as known to those skilled in the art, rotation of the pin 11 (by means of the lever 10) in a first direction of rotation counter clockwise with respect to FIGS. 1 and 2 results in the actuation stem 21b of the coupling 20b being pushed by the second end portion 12b of the rocker arm, and residual oil being released (and collected in the chamber 30), and therefore in the residual pressure inside the coupling 20b being relieved or at least decreased. In the same way, rotation of the pin 11 (by means of the lever 10) in a second direction of rotation clockwise with respect to FIGS. 1 and 2 (thus opposite to the above mentioned first direction of rotation), results in the actuation stem 21a of the coupling 20a being pushed by the first end portion 12a of the rocker arm, and residual oil being released (and collected in the chamber 30), and therefore in the residual pressure inside the coupling 20a being relieved or at least decreased. Multi-coupler connectors according to the prior art of the kind depicted in FIGS. 1 and 2 offer several advantages such as, by way of not limiting example, a good reliability and a simplified assembly procedure.

However, multi-coupler connectors according to the prior art of the kind depicted in FIGS. 1 and 2 offer are affected by drawbacks and/or disadvantages that the Applicant intends to overcome by means of the multi-couplers connector device according to the present invention.

As a first drawback it can be mentioned that the rocker arm, being rigid and in a single piece, requires the chamber 30 to be big enough to allow rotation of the rocker arm, wherein however a big chamber 30 means a corresponding big connector whilst to the contrary, for several applications, multi-coupler connectors of reduced or contained overall dimension are needed.

In fact, during rotation of the rocker arm, both first end portion 12a an second end portion 12b are rotated; as a result, when, by way of example, the rocker arm is rotated counter clockwise (with respect to FIGS. 1 and 2) so that the stem 21b is pushed by the end portion 12b, the chamber has to be shaped so as to allow the opposite end portion to be lowered; the above reasoning applies when the rocker arm is rotated clockwise. Accordingly, enough space has to be provided by the chamber 30 under the rocker arm, i.e., on the opposite side with respect to the couplers 20a and 20b.

A further drawback relates to the assembly procedure of connectors as depicted in FIGS. 1 and 2, which requires that the rocker arm be inserted first into the chamber 30 (before inserting the couplers 20a and 20b into the corresponding seats); however, the rigid rocker arm renders insertion and positioning thereof into the chamber 30 very difficult and troublesome, wherein the rocker arm can even get stacked in the chamber 30 before reaching its final position. Further problems moreover arise during keying of the rocker arm to the rotating pin 11, same being due as well to the rigidity of the rocker arm.

It is therefore a goal of the present invention to overcome or at least minimize the above summarized drawbacks affecting the multi-coupler connectors according to the background art. In particular, it is a first object of the present invention to provide a connector, in particular of the multi-coupler type with lever actuation, characterized by a reduced overall dimension and simplified assembly procedure and therefore by low assembly and production costs.

It is a further object of the present invention to provide a connector of the aforesaid type in which the housing body (see the description below) of the couplers and related actuation means (lever and rocker arm) does not comprise an assembly window for insertion of the above-mentioned components to be closed once the assembly is competed, but is rather made in a single piece, for example by means of fusing.

Finally, it is a further object of the present invention to provide a connector in which the actuation rocker arm is insertable into the main housing body and can be fixed to the corresponding rotation shaft or pin through the seats intended to house the two respective couplers.

SUMMARY OF THE PRESENT INVENTION

The present invention arises from the general consideration according to which the drawbacks affecting the connectors according to the prior art may be overcome or at least minimized by providing a rocker arm with rotatable end portions; in this way, in fact, each cam may be inserted into the main housing body through the seat intended to house the corresponding coupler, and a reduced space is needed for the rotation of the rocker arm.

Furthermore, a further consideration underlying the present invention relates to the fact that by suitably conforming the main housing body, in particular the interior thereof, by inserting the rocker arm into the corresponding coupler seat, the rocker arm will be led into the final position thereof (in which it is fixed to the rotation shaft, set in rotation by means of the external lever) essentially in an automatic manner, save for possible minor corrections easily carried out by an operator.

In consideration of both the foregoing and the drawbacks and/or disadvantages observed in the connectors of the known type, according to the present invention there is provided a multi-coupler connector device comprising a main body which defines a first seat and a second seat, and a first coupler and a second coupler housed in said first seat and said second seat, respectively, wherein said main body further defines a chamber in communication with each of said first seat and second seat, said device further comprising a rocker arm received in said chamber and adapted to be rotated on a rotation axis in a first direction of rotation and a second direction of rotation opposite to said first direction of rotation, wherein rotating said rocker arm in said first direction of rotation and said second direction of rotation results in said first coupler being actuated and the residual pressure inside thereof being relieved and respectively in said second coupler being actuated and the residual pressure inside thereof being relieved, wherein said rocker arm comprises a main support body adapted to be rotated in said first direction of rotation and second direction of rotation, along with a first actuating portion and a second actuating portion rotatably supported by said main support body so that rotating said main support body in said first direction of rotation and second direction of rotation results in said first coupler being actuated by said first actuating portion and respectively in said second coupler being actuated by said second actuating portion. According to an embodiment, rotating said main support body in said first direction of rotation and second direction of rotation results in said first actuating portion being dragged in said first direction of rotation and said main support body being rotated with respect to said main support body and respectively in said second actuating portion being dragged in said second direction of rotation and said main support body being rotated with respect to said first actuating portion.

According to an embodiment, said first actuating portion and second actuating portion comprise a first connecting portion and a second connecting portion, respectively, wherein said first connecting portion and second connecting portion are rotatably connected to said main support.

According to an embodiment, said main support portion has a U-shaped cross section defining an internal space, wherein said first connecting portion and second connecting portion of said first actuating portion and second actuating portion, respectively, are at least partially disposed inside said internal space on opposite sides with respect to said axis of rotation.

According to an embodiment, said main support portion defines a surface comprising a first abutting portion and a second abutting portion, and in that rotating said main support body in said first direction of rotation and second direction of rotation results in said first actuating portion being dragged in said first direction of rotation by said first abutting portion and respectively in said second actuating portion being dragged in said second direction of rotation by said second abutting portion.

According to an embodiment, said device further comprises a main pin received inside said chamber and adapted to be rotated on said axis of rotation in said first direction of rotation and second direction of rotation, wherein said main support portion of said rocker arm is rigidly fixed to said main pin so that rotating said main pin in said first direction of rotation and second direction of rotation results in said main support body and said first actuating portion being rotated in said first direction of rotation and respectively in said main support body and said second actuating portion being rotated in said second direction of rotation.

According to an embodiment, said main pin or shaft has a polygonal cross shape, wherein said main support body comprises a receiving hole of corresponding dimension and shape, and wherein said main pin or shaft is at least partially received inside said hole of said main support body.

According to an embodiment, said device further comprises an actuating lever at least partially disposed outside said main body so as to be actuatable by a user, wherein said actuating lever is mechanically connected to said main pin or shaft so that actuating said actuating lever results in said main pin being rotated.

According to an embodiment, said actuating lever is adapted to be actuated between a rest position and a first position and between said rest position and a second position, wherein actuation of said actuating lever from said rest position to said first position and from said rest position to said second position results in said main pin being rotated in said first direction of rotation along with said main support body and said first actuating portion and respectively in said main pin being rotated in said second direction of rotation along with said main support body and said second actuating portion.

According to an embodiment, the actuation of said first coupler involves the actuation of a first pressure relief valve of said first coupler, wherein the actuation of said second coupler involves the actuation of a second pressure relief valve of said second coupler.

According to an embodiment, said housing body is a single body without front access compartments.

Further embodiments and/or features of the present invention are defined in the claims.

BRIEF DESCRIPTION OF THE DRAWINGS

The present invention finds a particularly advantageous application in the case of hydraulic and/or pneumatic connectors of the multi-coupler type with lever actuation, this being the reason why the present invention will be clarified below with particular reference to the case of connectors of the aforesaid type; however, the possible applications of the present invention are not limited to connectors of the multi-coupler type with lever actuation. Conversely, the present invention finds application in connectors of different type, in particular in those in which the coupling of the male and female couplers provides for the prior relief of the residual pressure.

In the following, the present invention will be clarified in detail by means of the following detailed description of the (non-limiting) embodiments of the present invention depicted in the drawings, wherein:

In FIGS. 5a, 5b, 5c and 5d there is depicted an exploded, perspective view of a rocker arm of a multi-coupler connector device with lever actuation according to an embodiment of the present invention.

DETAILED DESCRIPTION OF THE INVENTION

In the following description, the female couplers to which reference is made shall be intended purely by way of non-limiting example; therefore, the present invention may be applied to any type of coupler that makes the employment thereof useful, providing, of course, the appropriate modifications.

Figure 3A:
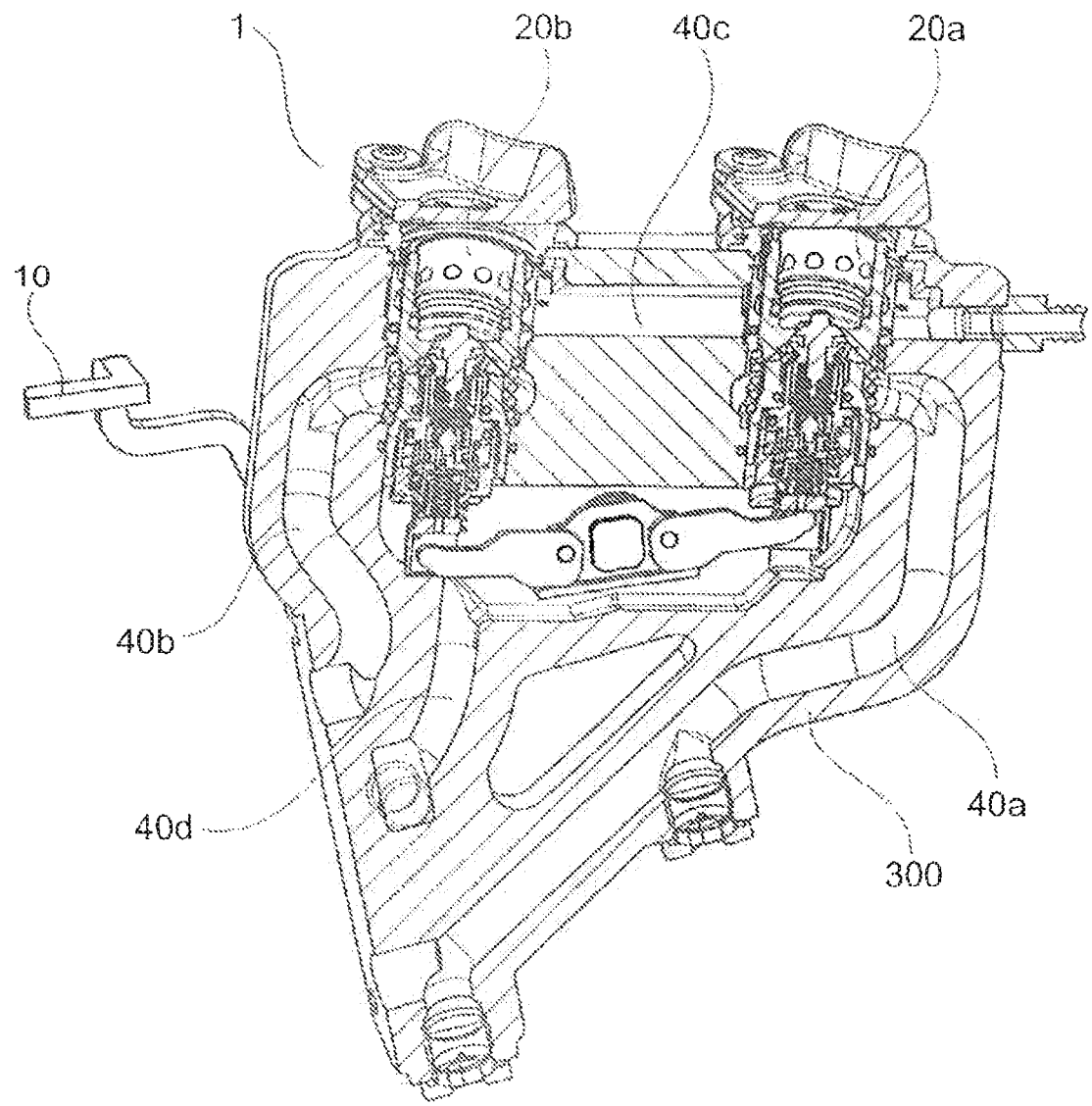
In FIGS. 3a and 3b there are depicted partial section views with a vertical transverse plane of the multi-coupler connector device with lever actuation according to an embodiment of the present invention in which the rocker arm is rotated in a first direction of rotation.
Figure 3B:
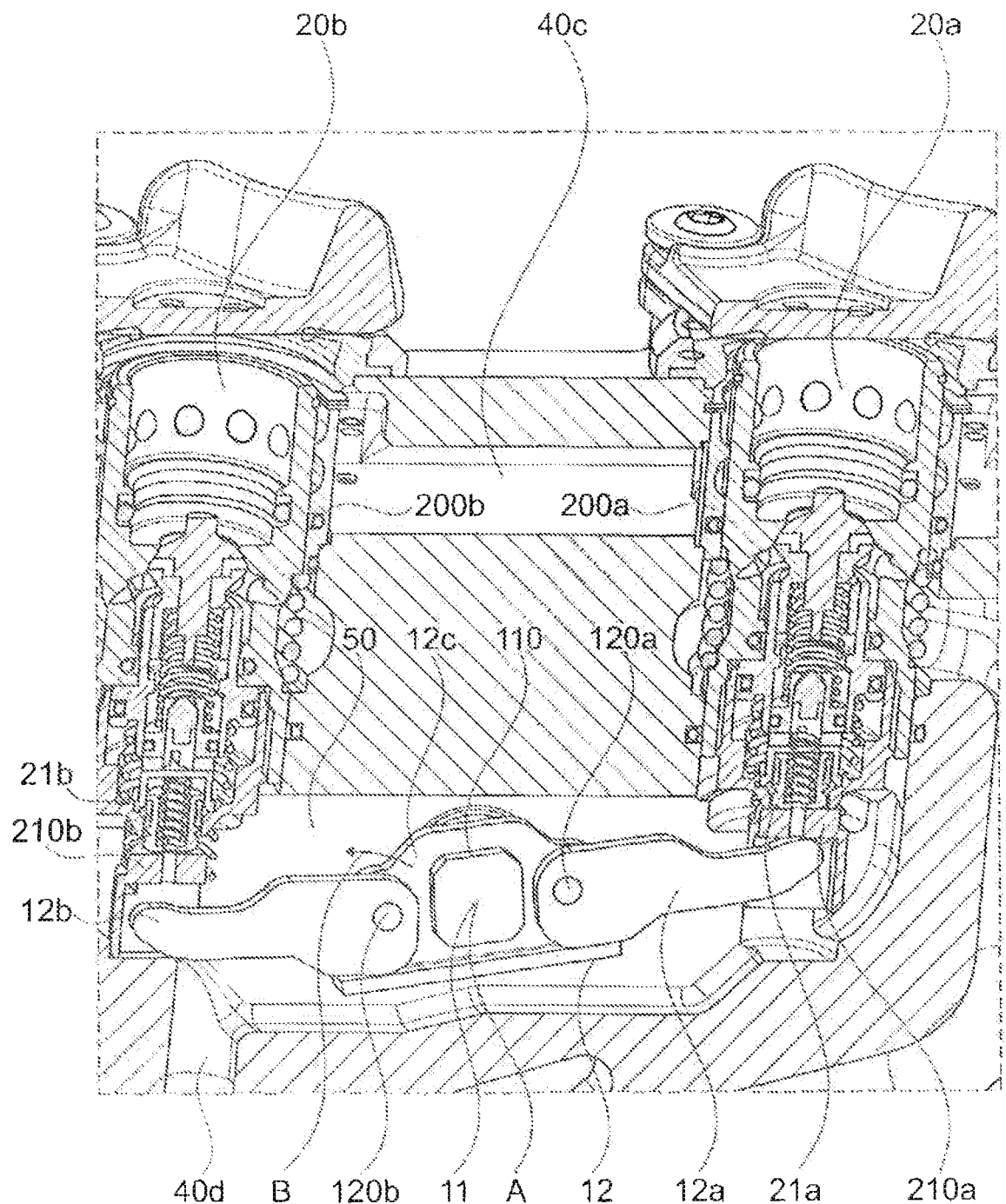

With particular reference to FIG. 3, reference numeral 1 identifies the connector device of an embodiment of the present invention.

The multi-coupler device 1 comprises at least a first female couplers 20a and a second female coupler 20b, housed in a first housing seat 200a and a second housing seat 200b, each defined by a main housing body or block 300.

Further defined by the housing body 300, in accordance with solutions substantially known in the background art and therefore not described in detail for the sake of conciseness, are connection channels 40a, 40b, 40c, 40d suitably provided to convey the working fluid, in particular, oil or gas.

Among these, in the lower region of the main housing body or block 30, a fluid relief chamber (not depicted) is provided in fluid communication with the channel 40d, wherein a containment inside chamber 50 is defined by the housing body or block 30 in fluid communication with bot the first seat 200a and the second seat 200b, below the female couplers 20a, 20b.

The first coupler 20a and second coupler 20b comprise a first actuation stem 21a and a second actuation stem 21b, wherein, as disclosed in detail in the following, actuation (translation) of the first stem 21a toward the inside of the first coupler 20a results in a relieving valve (not depicted) of the coupler 20a being actuated (and fluid released into the chamber 50 being released and residual pressure in the coupler 20a being decreased, and wherein, in the same way, actuation (translation) of the second stem 21b toward the inside of the second coupler 20b results in a relieving valve (not depicted) of the coupler 20b being actuated (and fluid released into the chamber 50 being released and residual pressure in the coupler 20b being decreased.

As depicted, the first stem 21a and second stem 21b comprise a first pusher 210a and a second pusher 210b, respectively, each extending at least partially outside the corresponding seat 200a and respectively 200b into the housing or containment chamber 50.

Figure 4A:
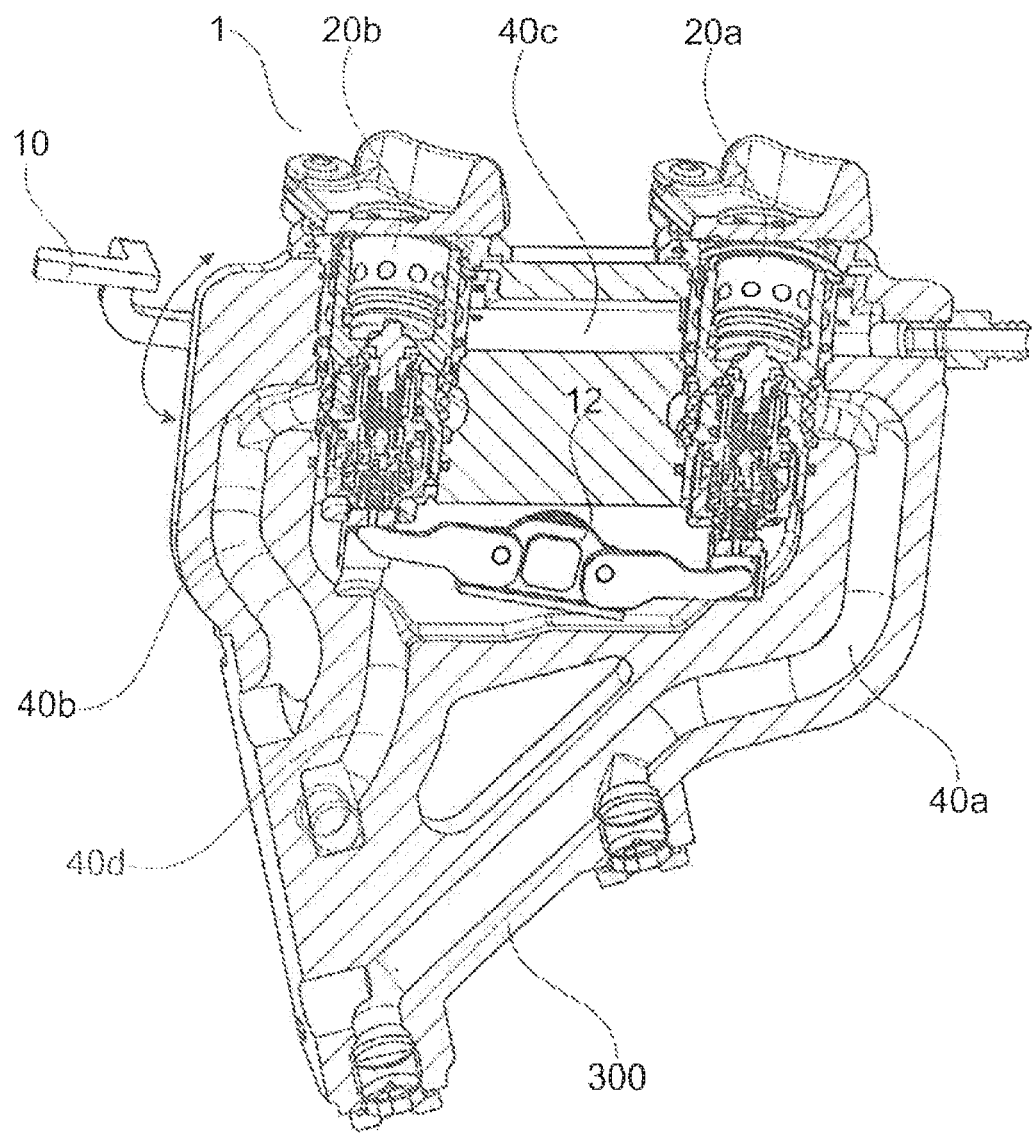
In FIGS. 4a and 4b there are depicted partial section views with a vertical transverse plane of the multi-coupler connector device with lever actuation according to an embodiment of the present invention in which the rocker arm is rotated in a second direction of rotation.
Figure 4B:
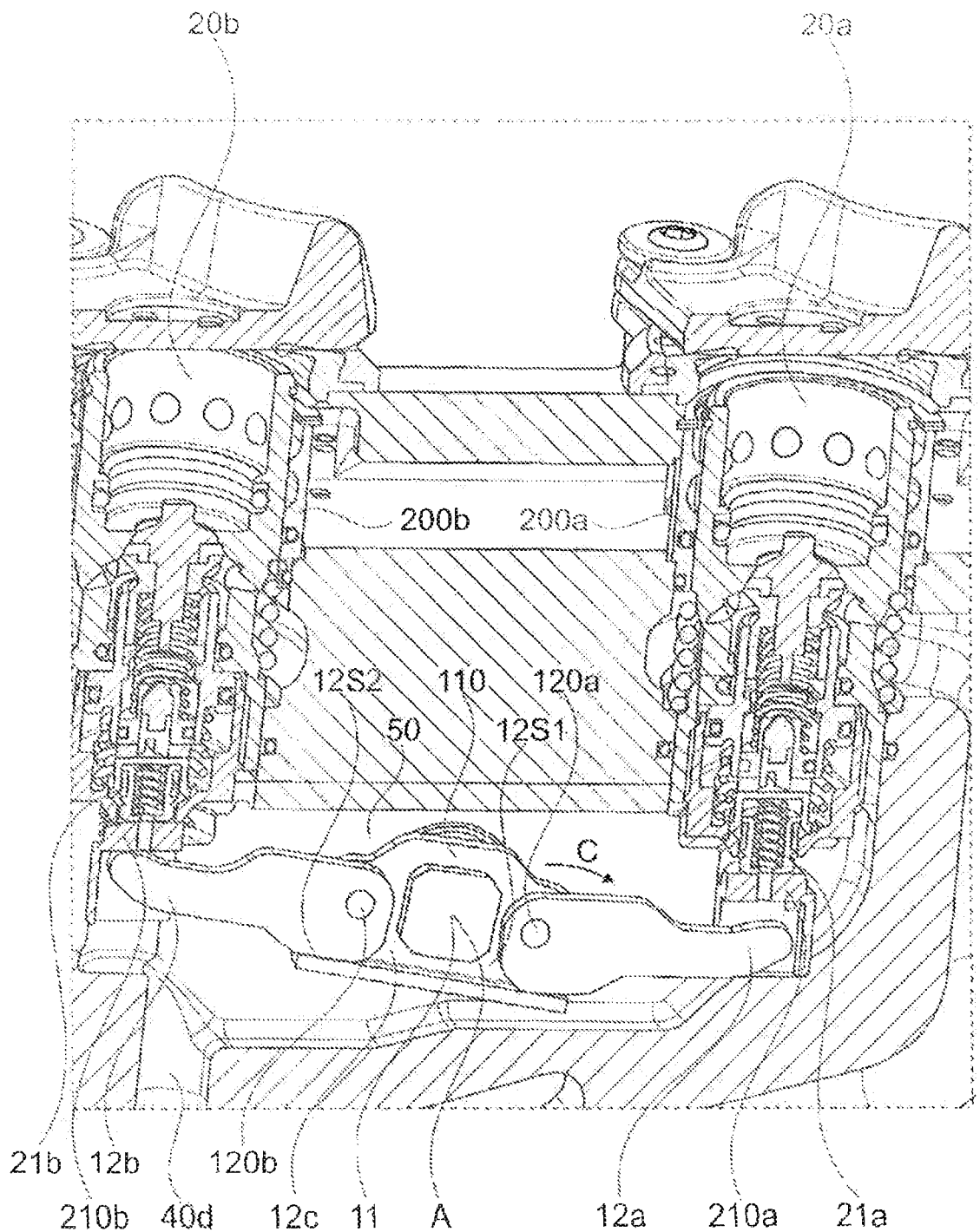

Advantageously, the device according to the embodiment of the present invention as depicted in the FIGS. 3 and 4 comprises an actuation lever 10 protruding outside the housing body or block 30 so as to be actuatable by user as schematically depicted by the double arrow in the figures.

Said actuation lever 10 may in fact be moved by the user, in particular alternately upwards and downwards (with respect to the Figures), wherein the downward and upward movement of the lever 10 determines a corresponding rotation in a first direction of rotation (counter clockwise with respect to the Figures) of a pin or small shaft 11 and respectively a corresponding rotation in a second direction of rotation (clockwise with respect to the Figures) of the pin or small shaft 11 with respect to an axis of rotation A perpendicular to the figures.

Moreover, and still as depicted, a rocker arm 12 is fixed to the shaft 11 so that rotating the shaft 11 according to the above (by means of the lever 10), namely in the first direction of rotation and in the opposite, second direction of rotation results in the rocker arm being rotated in said first direction of rotation (counter-clockwise) and said second direction of rotation (clockwise), respectively.

To this end, the shaft 11 has a polygonal shaped (in the non-limiting embodiment as depicted) cross section (in a plane perpendicular to the axis of rotation A), wherein the rocker arm 12 defines a hole 110 of matching shape and dimension. It arises therefore from the above that rotating said rocker arm 12 in said first direction of rotation (FIG. 3) and said second direction of rotation (FIG. 4) results in said first pusher 210a being translated toward the inside of the seat 200a and the first coupler 21a being actuated (and fluid inside thereof being released into the chamber 50 being released and the residual pressure inside thereof being relieved) and respectively in said second pusher 210b being translated toward the inside of the seat 200b and the second coupler 21b being actuated (and the fluid inside thereof being released into the chamber 50 and residual pressure inside thereof being relieved). Within the meaning of the present invention, "actuating" the first coupler 21a and second coupler 21b according to the above has to be understood as meaning that translation of the first pusher 210a and second pusher 210b results in a first valve body of the first coupler 21a and a second valve body of the second coupler 21b being translated according to procedures substantially known to those skilled in the art and therefore not described in detail herewith for the sake of conciseness.

As anticipated, an important distinguishing feature of the multi-coupler connector according to the present invention relates to the rocker arm 12.

In fact, as depicted, the rocker arm 12 comprises a main support body or portion 12c (fixed to the shaft 11 according to the above), along with a first actuating portion 12a and a second actuating portion 12b each rotatably connected to the main support portion 12c by means of first connecting means 120a (a pin, a shaft or the like) and respectively second connecting means 120b (a pin, a shaft or the like), said first actuating portion 12a and second actuating portion 12b being rotatably fixed to the main support body 12c on opposite sides with respect to the main shaft 11 (or axis of rotation A).

Moreover, said main support portion 12c, first actuating portion 12a and second actuating portion 12b are shaped in such that rotation of the main support portion 12c in the first direction of rotation (counter-clockwise, see FIG. 3) results in said first actuating portion 12a being dragged in the same direction of rotation so as to push the pusher 210a according to the above, whilst rotation of the main support portion 12c in the second direction of rotation (clockwise, see FIG. 4)

results in said second actuating portion 12b being dragged in the same direction of rotation so as to push the pusher 210b, still according to the above.

However, during rotation of the main support portion 12c in the first direction of rotation (counter-clockwise, see FIG. 3) solely said first actuating portion 12a is dragged in the same direction of rotation whilst the main support portion 12c is rotated with respect to the second actuating portion 12b (see arrow B in FIG. 3), whilst in a corresponding way, during rotation of the main support portion 12c in the second direction of rotation (clockwise, see FIG. 4) solely said second actuating portion 12b is dragged in the same direction of rotation and the main support portion 12c is rotated with respect to the first actuating portion 12a (see the arrow C in FIG. 4).

Further details of the rocker arm 12 of the multi-coupler connector according to an embodiment of the present invention are described below with reference to FIG. 5. As depicted, said main support portion 12c has a U-shaped cross section (on a plane parallel to the axis of rotation A, see FIG. 5d) defining an internal space 12S, wherein said first actuating portion 12a and second actuating portion 12b comprise a first connecting portion 122a and respectively a second connecting portion 122b each of them being at least partially disposed inside said internal space 12S on opposite sides with respect to said axis of rotation A.

Moreover, said main support portion 12c defines an internal surface comprising a first abutting portion 12S1 and a second abutting portion 12S2 (on opposite sides with respect to the axis A and/or the hole 110), the first actuating portion 12a and second actuating portion 12b being positioned with respect to the main support body 12c so that rotating said main support body 12c in said first direction of rotation and second direction of rotation results in said first actuating portion 12a being dragged in said first direction of rotation by said first abutting portion 12S1 and respectively in said second actuating portion 12b being dragged in said second direction of rotation by said second abutting portion 12S2.

The operation modes of the connector device according to the embodiment of the present invention as depicted in the drawings may be summarized as follows.

Figure 5B:
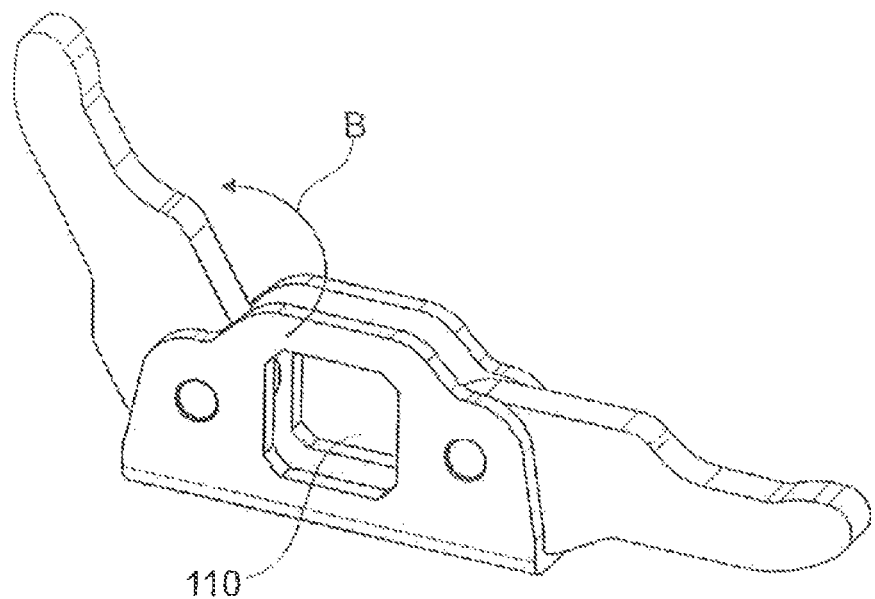
Figure 5C:
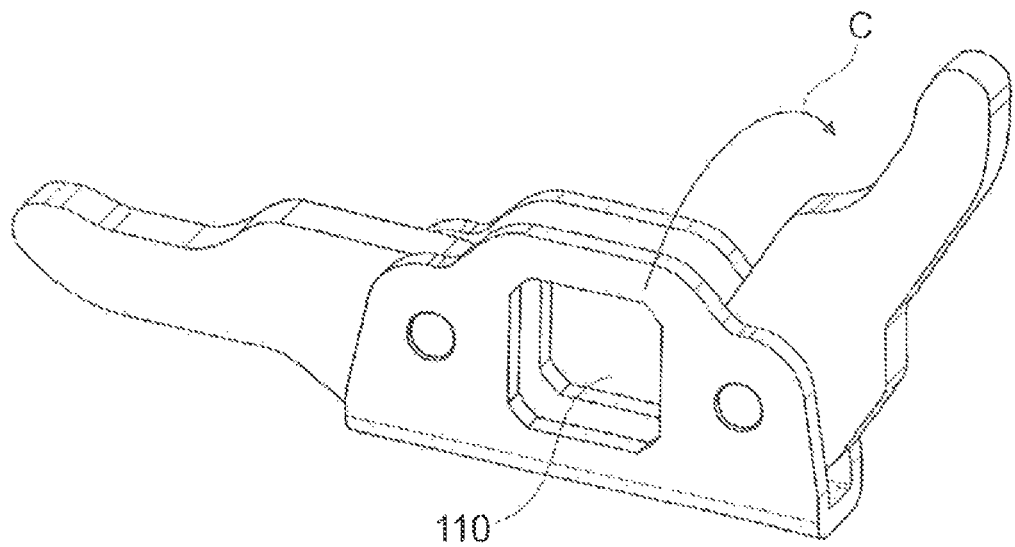
Figure 5D:
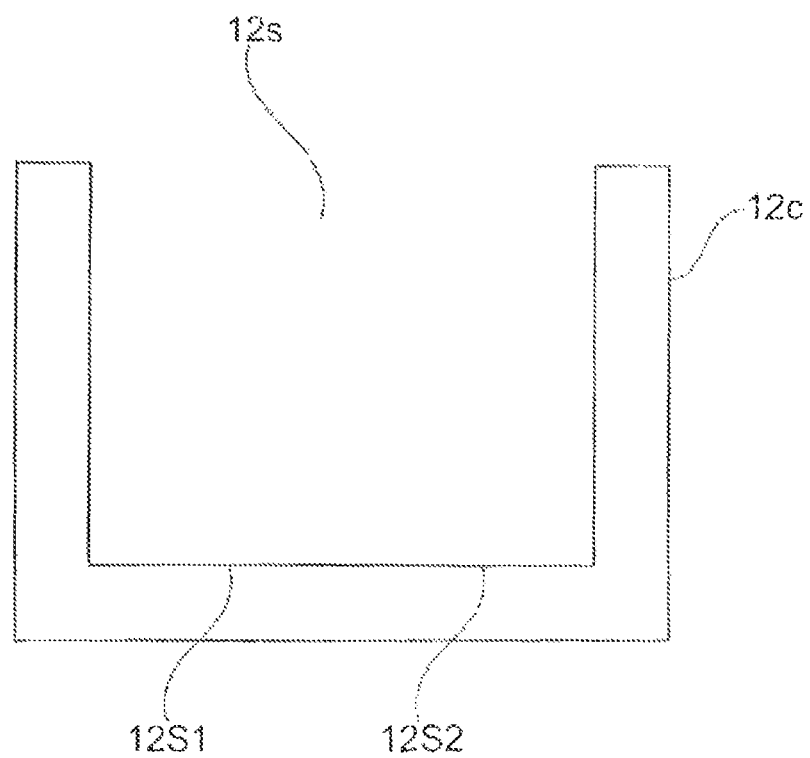

In the starting configuration, also called "neutral" as depicted in FIG. 5a, prior to the connection of the female couplers 20a and 20b with corresponding male couplers (not depicted in the drawings), the lever 10 and the pin 11 are both in neutral position, wherein each of the first actuating portion 12a and second actuating portion 12b, engages with (or is closed to), without pushing, the first pusher 210a and respectively the second pusher 210b.

Furthermore, the pushers 210a and 210b are both kept in the lower position (extending at least partially inside the chamber 50) by means of corresponding thrust springs.

As anticipated, when a user pushes the lever 10 downwards, the pin 11 is rotated counterclockwise with reference to the Figures, wherein, as anticipated solely the first actuating portion is rotated (counter-clockwise) whilst the main support body 12c is rotated with respect to the second actuating portion 12b, so that the first actuating portion 12a acts by pushing on the pusher 210a and causes the upwards shifting movement of the pusher 210a with corresponding relief of the residual pressure in the coupler 21a.

In a similar way, when a user pushes the lever 10 upwards, the pin 11 is rotated clockwise with reference to the Figures, wherein, as anticipated solely the second actuating portion 12b is rotated (clockwise) whilst the main support body 12c is rotated with respect to the first actuating portion 12a, so that the second actuating portion 12b acts by pushing on the pusher 210b and causes the upwards shifting movement of the pusher 210b with corresponding relief of the residual pressure in the coupler 21b.

Figure 1:
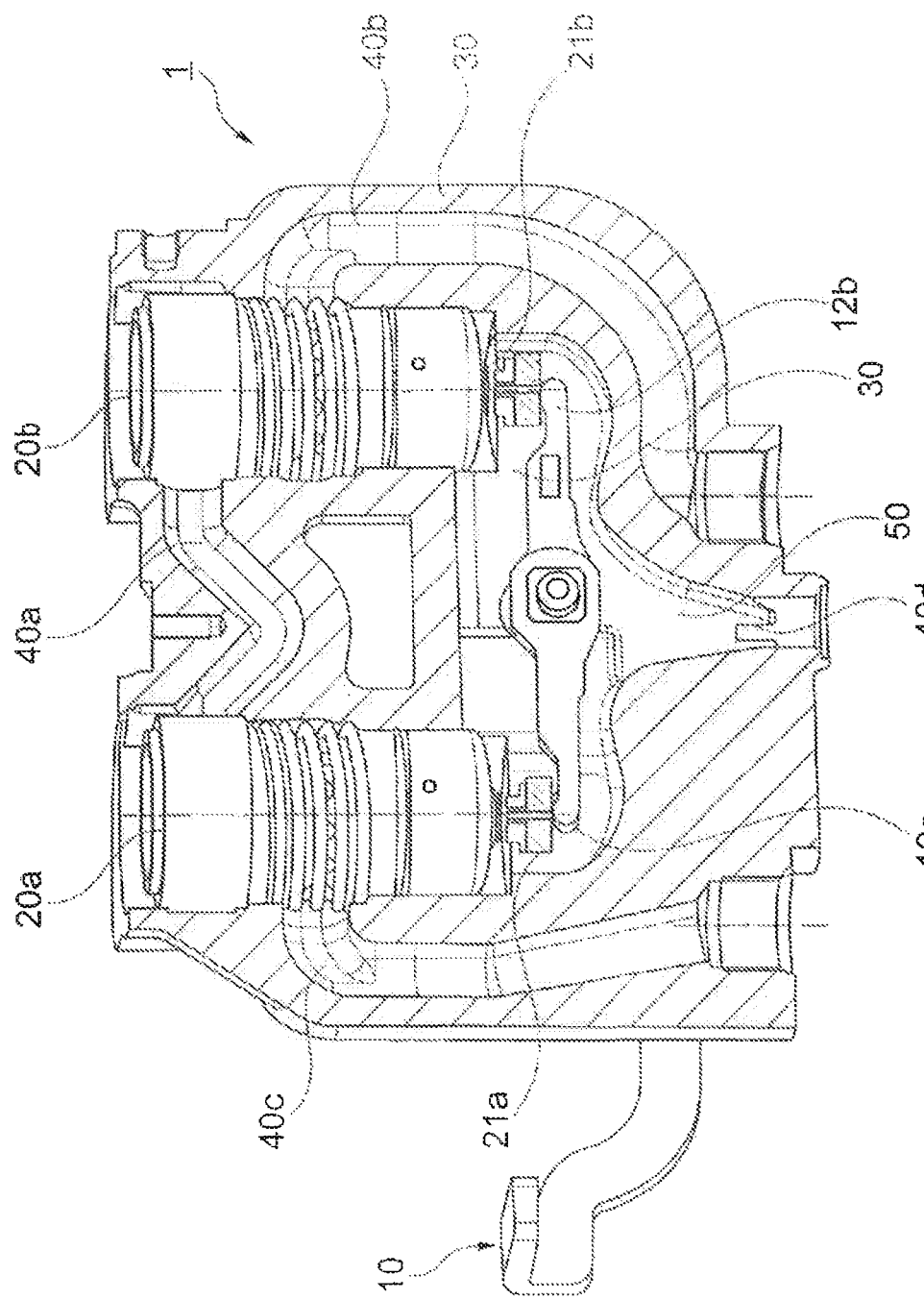
In FIGS. 1 and 2 there are depicted partial section views with a vertical transverse plane of a multi-coupler connector device with lever actuation according to the prior art.
Figure 2:
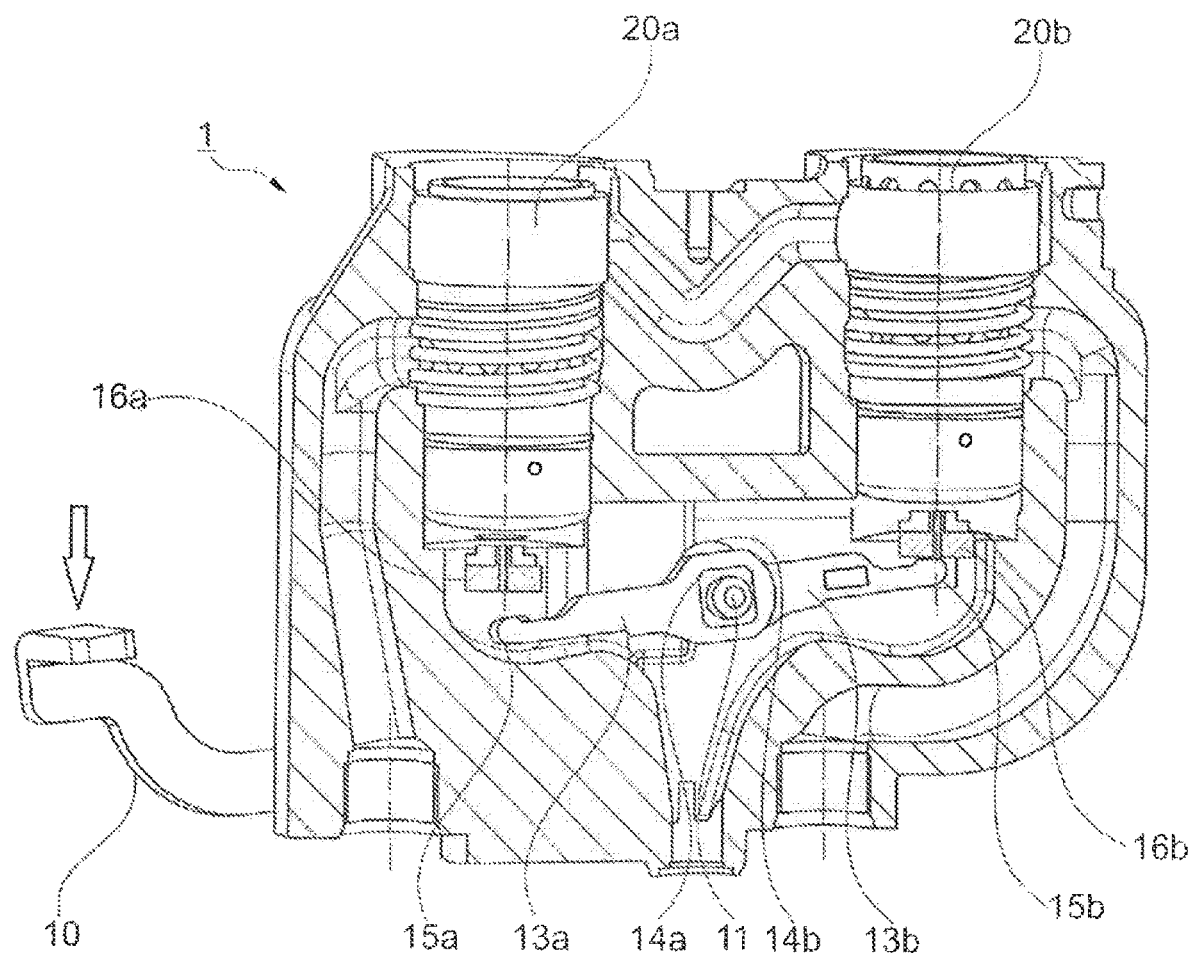

Similar to what described above with reference to FIG. 2, it is noted how an upwards movement of the lever 10 involves a clockwise rotation of the pin 11, wherein, therefore, the cams 12a and 12b are rotated in the same clockwise direction of rotation, and therefore wherein the free end 15a of the cam 12a acts by pushing on the pusher 16a and causes the upwards shifting movement of the second pusher 16a, which therefore actuates the decompression valve of the second coupler 20a.

With reference to the drawings, assembly of the connector 1 is described in the following.

Thanks to the particular rocker arm 12, the rocker arm can be preventively (beforehand) assembled so as to comprise the main support body 12c, the first actuating portion 12a and the second actuating portion 12b (see FIG. 5) and subsequently inserted into the chamber 50 through the one of the seats 200a and 200b, intended to house the couplers 20a and 20b, respectively.

Therefore, before the couplers 20a and 20b are inserted into the seats thereof inside the containment body 30, the rocker arm 12 is inserted through one of said seats. In particular, the arm can be dropped by gravity through one of the seats 200a, 200b, until reaching the internal surface of the chamber 50.

Thereafter, the operator performing the assembly, manually or possibly by means of simple tools, leads the main support body 12c so as to position same with the engagement hole 110 superimposed (along the axis of rotation A) with the shaft 11 11 wherein thereafter, the arm 12 is moved along the axis of rotation until the shaft 11 is at least partially received inside the hole 110.

It has thus been shown, by means of the above detailed description of the embodiments of the connector device according to the present invention as depicted in the drawings, that the present invention allows to achieve the preset objects and, therefore, to overcome or at least minimize the drawbacks observed in the multi-coupler connector devices of the background art.

In particular, the present invention makes it possible to provide a connector with a containment chamber of reduce or contained dimension, the connector of the present invention being thus characterized by contained overall dimension and being therefore adapted to be used in all those applications in which only a small space is at disposal for the installation of the connector.

Moreover, the present invention makes it possible to simplify the assembly procedure and therefore to contain the assembly and production costs.

Thanks to the present invention, there is no need for the housing body (see the description above) of the couplers and related actuation means (in particular rocker arm) to be provided with an assembly window for insertion of the above-mentioned components to be closed once the assembly is competed, but can rather be made in a single piece, for example by means of fusing.

The connector device according to the present invention is subject to those modifications which, based on the detailed description of the embodiments shown in the accompanying drawings, will be apparent and obvious to those skilled in the art.

For example, with reference to the shape of the engagement portion of the pin 11, shapes with sections different from a square one (with or without rounded corners) may be preferred, for example, triangular, pentagonal, hexagonal sections, and so on.

In the same way, depending on the requirements and/or circumstances, both the number of couplers housed in the main body, as well as the type of couplers, male or female, may vary.

Finally, depending on the requirements and/or circumstances, the direction of rotation, clockwise or counterclockwise, of the pin 11, and therefore of rocker arm 12, generated by the upwards or downwards movement, respectively, of the lever 10, may be varied.

The scope of the present invention is therefore defined by the appended claims.

The invention claimed is:

1. A multi-coupler connector device comprising a main body which defines a first seat and a second seat, and a first coupler and a second coupler housed in said first seat and said second seat, respectively, wherein said main body further defines a chamber in communication with each of said first seat and second seat, said device further comprising a rocker arm received in said chamber and adapted to be rotated on a rotation axis (A) in a first direction of rotation and a second direction of rotation opposite to said first direction of rotation, wherein rotating said rocker arm in said first direction of rotation and said second direction of rotation results in said first coupler being actuated and the residual pressure inside thereof being relieved and respectively in said second coupler being actuated and the residual pressure inside thereof being relieved, wherein said rocker arm comprises a main support body adapted to be rotated around said rotation axis (A) in said first direction of rotation and second direction of rotation, along with a first actuating portion and a second actuating portion rotatably supported by said main support body so that rotating said main support body in said first direction of rotation and second direction of rotation results in said first coupler being actuated by said first actuating portion and respectively in said second coupler being actuated by said second actuating portion, wherein the first actuating portion and the second actuating portion are rotatably supported by said main support body to rotate with respect to said main support body around axes which are spaced from and parallel to said rotation axis (A).

2. The multi-coupler connector device according to claim 1, wherein rotating said main support body in said first direction of rotation and second direction of rotation results in said first actuating portion being dragged in said first direction of rotation and said main support body being rotated with respect to said second actuating portion, and respectively in said second actuating portion being dragged in said second direction of rotation and said main support body being rotated with respect to said first actuating portion.

3. The multi-coupler connector device according to claim 2, wherein said first actuating portion and second actuating portion comprise a first connecting portion and a second connecting portion, respectively, and wherein said first connecting portion and second connecting portion are rotatably connected to said main support body.

4. The multi-coupler connector device according to claim 3, wherein said main support body has a U-shaped cross section defining an internal space, and wherein said first connecting portion and second connecting portion of said first actuating portion and second actuating portion, respectively, are at least partially disposed inside said internal space on opposite sides with respect to said axis of rotation (A).

5. The multi-coupler connector device according to claim 1, wherein said main support body defines a surface comprising a first abutting portion and a second abutting portion, and in that rotating said main support body in said first direction of rotation and second direction of rotation results in said first actuating portion being dragged in said first direction of rotation by said first abutting portion and respectively in said second actuating portion being dragged in said second direction of rotation by said second abutting portion.

6. The multi-coupler connector device according to claim 5, wherein said device further comprises a main pin or shaft received inside said chamber and adapted to be rotated on said axis of rotation (A) in said first direction of rotation and second direction of rotation, and wherein said main support body of said rocker arm is rigidly fixed to said main pin or shaft so that rotating said main pin or shaft in said first direction of rotation and second direction of rotation results in said main support body and said first actuating portion being rotated in said first direction of rotation and respectively in said main support body and said second actuating portion being rotated in said second direction of rotation.

7. The multi-coupler connector device according to claim 6, wherein said main pin or shaft has a polygonal cross shape, wherein said main support body comprises a receiving hole of corresponding dimension and shape, and wherein said main pin or shaft is at least partially received inside said hole of said main support body.

8. The multi-coupler connector device according to claim 7, wherein said device further comprises an actuating lever at least partially disposed outside said main body so as to be actuatable by a user, and wherein said actuating lever is mechanically connected to said main pin or shaft so that actuating said actuating lever results in said main pin or shaft being rotated.

9. The multi-coupler connector device according to claim 8, wherein said actuating lever is adapted to be actuated between a rest position and a first position and between said rest position and a second position, wherein actuation of said actuating lever from said rest position to said first position and from said rest position to said second position results in said main pin or shaft being rotated in said first direction of rotation along with said main support body and said first actuating portion and respectively in said main pin or shaft being rotated in said second direction of rotation along with said main support body and said second actuating portion.

10. The multi-coupler connector device according to claim 1, wherein the actuation of said first coupler involves the actuation of a first pressure relief valve of said first coupler, and wherein the actuation of said second coupler involves the actuation of a second pressure relief valve of said second coupler.

11. The multi-coupler connector device according to claim 1, wherein said housing body is a single body without from access compartments.

12. The multi-coupler connector device according to claim 1, wherein said chamber is shaped so as to lead in an obliged manner the positioning of said rocker arm during assembly of said device.

* * * * *